United States Patent
Cho (10) Patent No.: US 6,647,498 B1
(45) Date of Patent: Nov. 11, 2003

(54) METHOD AND APPARATUS FOR PREVENTING PERSONAL COMPUTER FROM BEING ILLEGALLY USED

(75) Inventor: Jong-il Cho, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/313,661

(22) Filed: May 18, 1999

(30) Foreign Application Priority Data

Jul. 15, 1998 (KR) .......................................... 98-28654

(51) Int. Cl.⁷ .............................. G06F 11/00; H04L 9/00
(52) U.S. Cl. ...................... 713/202; 713/200; 713/183; 713/184
(58) Field of Search ............................... 713/202, 201, 713/200, 183, 184

(56) References Cited

U.S. PATENT DOCUMENTS

| | | | | |
|---|---|---|---|---|
| 4,959,860 A | * | 9/1990 | Watters et al. ............... | 713/202 |
| 5,222,231 A | * | 6/1993 | Gunji .......................... | 713/202 |
| 5,430,867 A | * | 7/1995 | Gunji .......................... | 713/202 |
| 5,537,544 A | * | 7/1996 | Morisawa et al. .......... | 713/202 |
| 5,704,040 A | * | 12/1997 | Gunji .......................... | 713/202 |
| 5,931,948 A | * | 8/1999 | Morisawa et al. .......... | 713/202 |
| 6,012,145 A | * | 1/2000 | Mathers et al. ............. | 713/202 |
| 6,026,491 A | * | 2/2000 | Hiles ........................... | 713/202 |

* cited by examiner

Primary Examiner—Ly V. Hua
(74) Attorney, Agent, or Firm—Robert E. Bushnell, Esq.

(57) ABSTRACT

An apparatus and a method for preventing a personal computer from being illegally used are provided. A personal computer includes a RAM for storing a plurality of programs having application programs and an operation system, a flash memory of a BIOS ROM for storing a BIOS including a POST module for checking the state of a computer and booting the computer when power is applied and an interrupt processing module for managing peripheral equipments, a microprocessor for executing the plurality of programs and the BIOS, and a CMOS RAM for storing system information which must be maintained though power is intercepted. Both the CMOS RAM and the flash memory of the BIOS ROM respectively include areas for storing passwords. If A password input by a user is identical to a first password stored in CMOS RAM, booting the computer is processed when the first password is set in the CMOS RAM. If the first password is not set and not stored in the CMOS RAM, the password input by a user is compared with the second password stored in flash memory. When the input password is identical to the second password stored in the flash memory, booting the computer is processed.

28 Claims, 11 Drawing Sheets

METHOD AND APPARATUS FOR PREVENTING PERSONAL COMPUTER FROM BEING ILLEGALLY USED

CLAIM OF PRIORITY

This application makes reference to, incorporates the same herein, and claims all benefits accruing under 35 U.S.C. § 119 from an application entitled METHOD FOR PROTECTING A PC FROM BEING STOLEN USING PASSWORD earlier filed in the Korean Industrial Property Office on the 15$^{th}$ day of July 1998, and there duly assigned Serial No. 98-28654, a copy of which is annexed hereto.

BACKGROUND OF THE INVENTION

1. Field of the Invention

The present invention relates to a method and an apparatus for preventing a computer from being used by an unauthorized user, and more particularly, to a method and an apparatus for preventing a personal computer from being illegally used by using a password.

2. Description of the Related Art

Passwords have been used in a personal computer. Typically a password is used for enabling a resume function when a main power is turn on in a personal computer. The personal computer is classified into a desktop computer used on a desk, a portable laptop computer which can be used on laps of a user, a note book computer which is thin and small so as to be put into a case, and a palmtop computer which can be used on a palm of a user. In any type of computer, a power-on password function allows the computer to distinguish between an authorized user and an unauthorized user before the resume function is enabled.

As the personal computer becomes smaller, security information stored in the computer as well as prevention of the computer from being stolen is requested. For this, in a conventional technology, a password known to only a user is stored in a memory, the password is input by the user whenever the personal computer is booted, and the input password is compared with a stored password stored in the memory. The authorized user may use the computer.

However, the conventional method for storing a password in a memory is not preventing the computer from being stolen and is useless for a person who knows the structure of the personal computer. If anyone intercepts off a backup power from the memory, the password stored in the memory disappears. Then, the unauthorized user who has stolen the computer may use the computer.

U.S. Pat. No. 4,959,860 for a Power Password Function For Computer System issued to Watters et al. discloses a battery-powered RAM storage area used to hold a used defined password when the system is turned off. The battery-powered RAM storage area is protected against being accessible by unauthorized users when the system is turned on. This reference, however, fails to show the interception by the unauthorized user and any other protection to prevent the unauthorized user from using the computer.

U.S. Pat. No. 5,222,231 and U.S. Pat. No. 5,430,867 for a Data Processing System Having a Resume Function And an Operating Method thereof and U.S. Pat. No. 5,704,040 for a Computer Having Resume Function issued to Gunji respectively disclose a backup RAM having a volatile memory supplied with a backup power or an EEPROM. The back up RAM includes a password area for storing a password, a check sum, and a password flag. Also, this reference does not show to prevent an unauthorized user from using the computer.

U.S. Pat. No. 5,537,544 for a Portable Computer System Having Password Control Means For Holding One Or More Passwords Such That The Passwords Are Unreadable By Direct Access From A Main Processor issued to Morisawa et al. discloses a Password memory such as an EEPROM storing a plurality of registered passwords along with access right data assigned to the registered passwords. This reference does not show to prevent the unauthorized user from intercepting the backup power to the EEPROM and using the computer.

The conventional methods and apparatus merely store or control a plurality of passwords and enable the resume function when password input by user is compared with the stored password. I have noticed that the art, as indicated by the foregoing examples, fails to show to prevent the unauthorized user from intercepting the backup power to the EEPROM and using the computer. Moreover, the conventional method is not enough to prevent an unauthorized user from using the computer. Furthermore, the unauthorized user may be encouraged to steal and use the conventional computer.

SUMMARY OF THE INVENTION

It is an object of the present invention to provide a method and an apparatus for preventing an unauthorized user from illegally using a computer.

It is another object to provide a method and an apparatus for discouraging an unauthorized user to steal and use a computer.

It is still object to provide a method and an apparatus for preventing an unauthorized user from deleting a password stored in a computer.

It is yet another object to provide a method and an apparatus for storing a password into at least two memories.

It is still another object to provide a method and an apparatus for determining whether a user is an unauthorized user.

It is further object to provide a method and an apparatus for using a second password in order to determine whether a user is an unauthorized user when a first password is deleted It is another further object to provide a method and an apparatus for using a second password in order to determine whether a user is an unauthorized user when a first password is not set.

These and other objects may be achieved by using a method and an apparatus in a computer to provide a password checking program and at least two memories storing passwords such as a first password and a second password. The first password is stored in CMOS RAM and the second password is stored in BIOS ROM. During performing a POST process, the password is stored in memories included in the computer. If the first password stored in the CMOS RAM, when the password is stored in the CMOS RAM, is identical to a password input by a user, booting the computer continues. If not, booting the computer is stopped. If a password is not set to the CMOS RAM, the password input by the user is compared to the second password stored the flash memory in the BIOS ROM. If the password input by the user is identical to the second password stored in the flash memory when the second password is set to the flash memory, booting the computer continues. If not, booting the computer is stopped.

BRIEF DESCRIPTION OF THE DRAWINGS

A more complete application of this invention, and many of the attendant advantage thereof, will be readily apparent as the same becomes better understood by reference to the following detailed description when considered in conjunction with the accompanying drawing in which like reference symbols indicate the same or similar components, wherein.

DESCRIPTION OF THE PREFERRED EMBODIMENTS

Figure 1A:
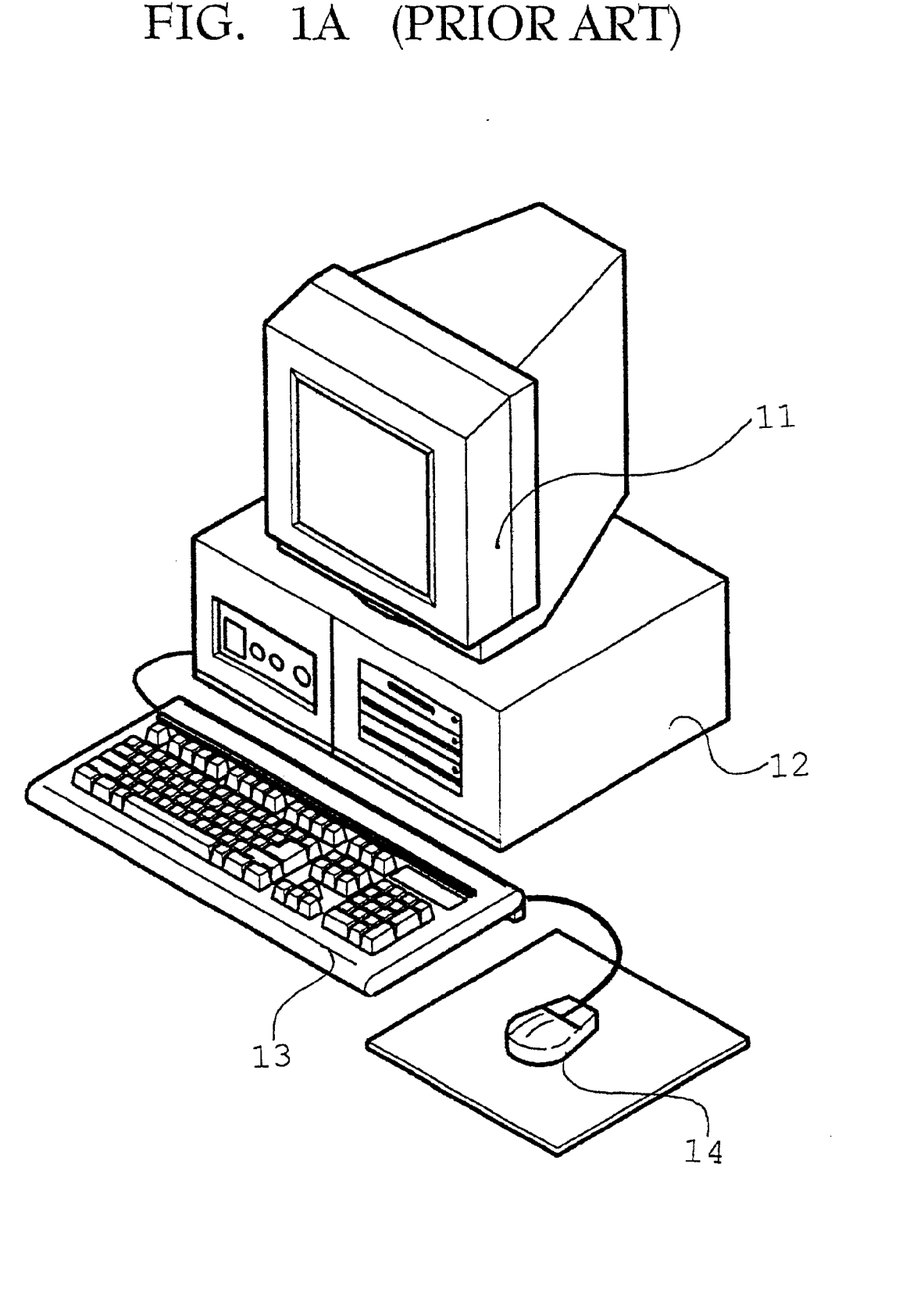
FIG. 1A shows an external appearance of a desktop computer.
Figure 1B:
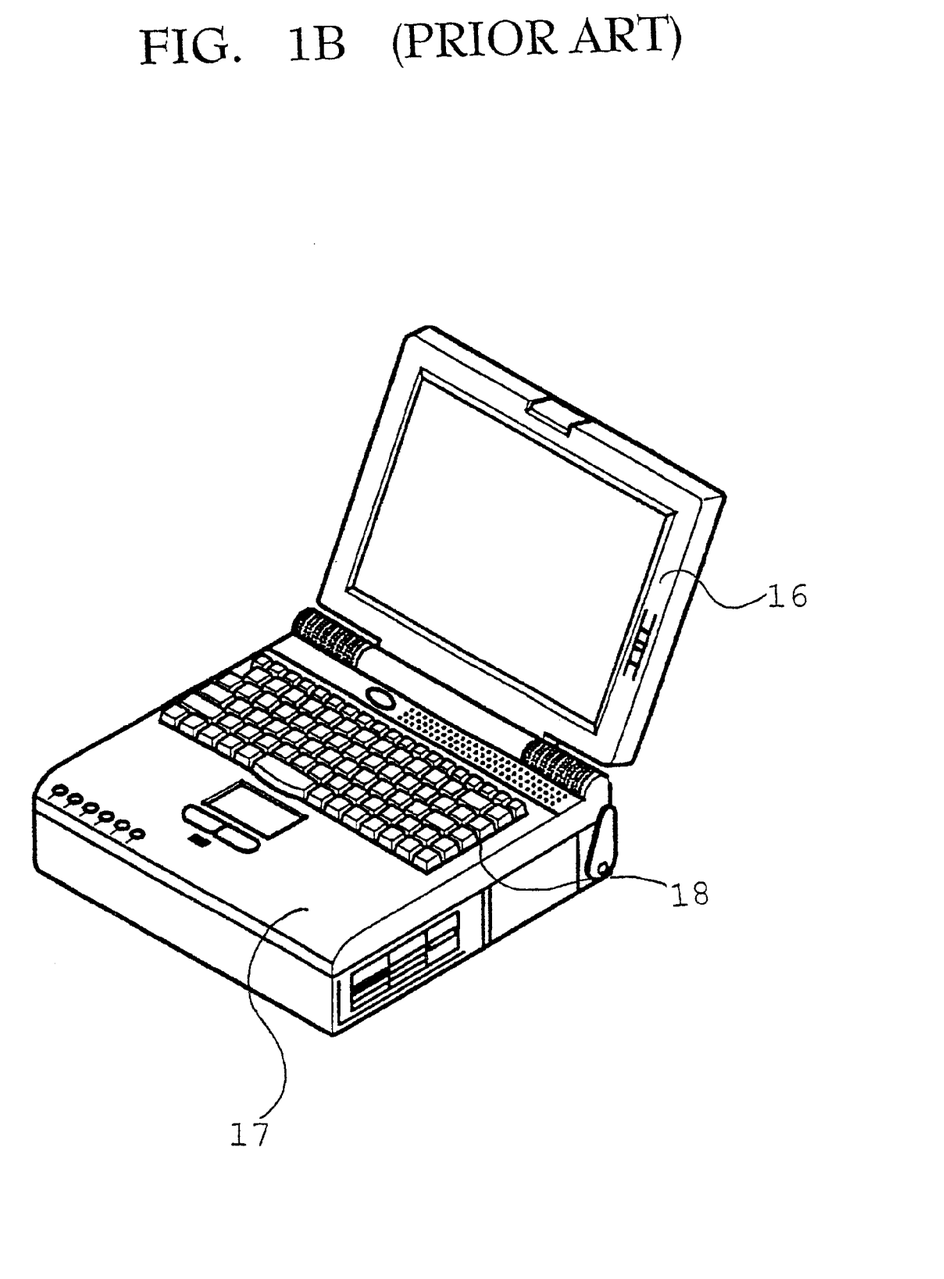
FIG. 1B shows an external appearance of a notebook computer.

FIG. 1A and FIG. 2 show an external appearance of a desktop computer and a notebook computer. The desktop compute includes a monitor 11, a main body 12 containing a CPU for controlling a system operation, memories, and input/output interfaces, a keyboard 13 and a mouse 14 connected to the main body through the input/output interface. The notebook computer driven by a battery (not shown) includes a main body 17 containing keys 18 and a LCD monitor connected to the main body through a input/output interface to display a data from the main body.

Figure 2:
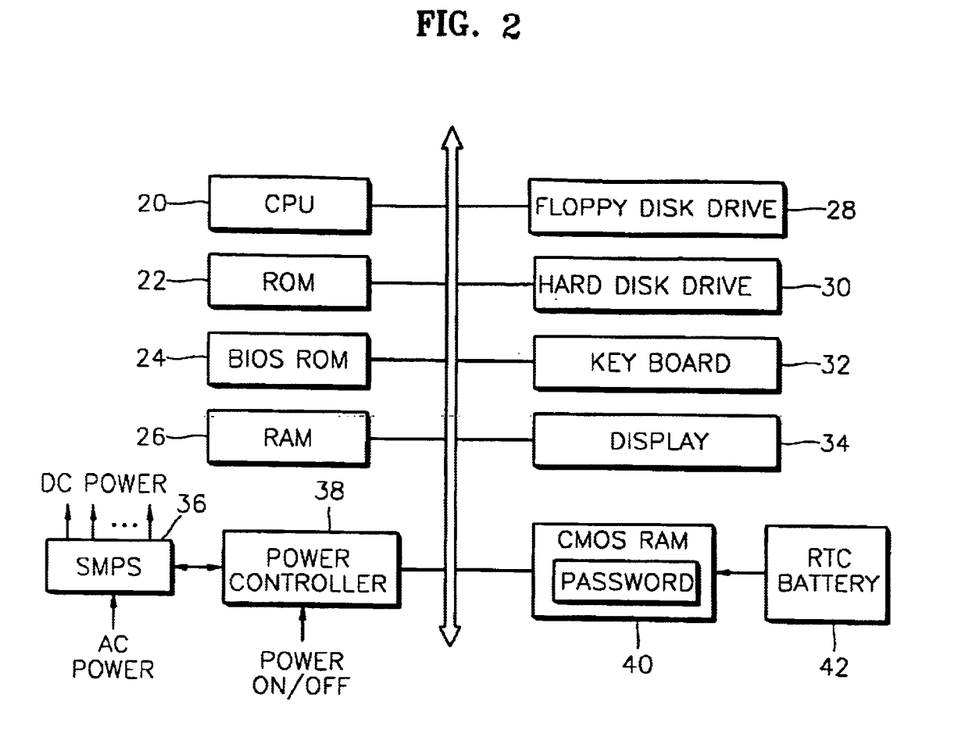
FIG. 2 is a block diagram showing an arrangement of a personal computer.

In FIG. 2, a personal computer includes a central processing unit (CPU) 20 for controlling a system operation, a ROM 22, a basic input and output system ROM (BIOS ROM) 24 for storing a power on self test (POST) module for checking a state of the computer when power is applied to the computer and an interrupt processing module for managing peripheral equipments, a RAM 26 for storing data, operating system, and a plurality of application programs, auxiliary memories such as a floppy disk driver 28 and a hard disk drive 30, input apparatuses such as a keyboard 32, output apparatuses such as a display 34, a switching mode power supply (SMPS) 36 for receiving an alternating current power source and supplying direct current power sources to the respective apparatuses, a power controller 38 for receiving on/off signals from a power switch and generating a control signal for controlling the SMPS 36, and a complementary metal oxide semiconductor RAM (CMOS RAM) 40 for receiving power supplied from a real time clock (RTC) battery 42 and storing system information which must be maintained while the alternating current power supplied from the outside is intercepted.

As the personal computer becomes smaller, the security of information stored in the computer as well as prevention of a computer from being stolen is needed. For this, a password known to only a user of the computer is stored in the CMOS ROM 40 in the computer. The password is input from a user whenever the personal computer is booted. The input password input by the user is compared with a stored password stored in the CMOS RAM 40.

However, the conventional methods for storing a password in a CMOS RAM are not protecting a computer from being stolen and are useless for a person who knows the structure of personal computer. If anyone intercepts the power of the RTC battery 42 from the CMOS RAM 40, the password stored in the CMOS RAM disappears.

Figure 3:
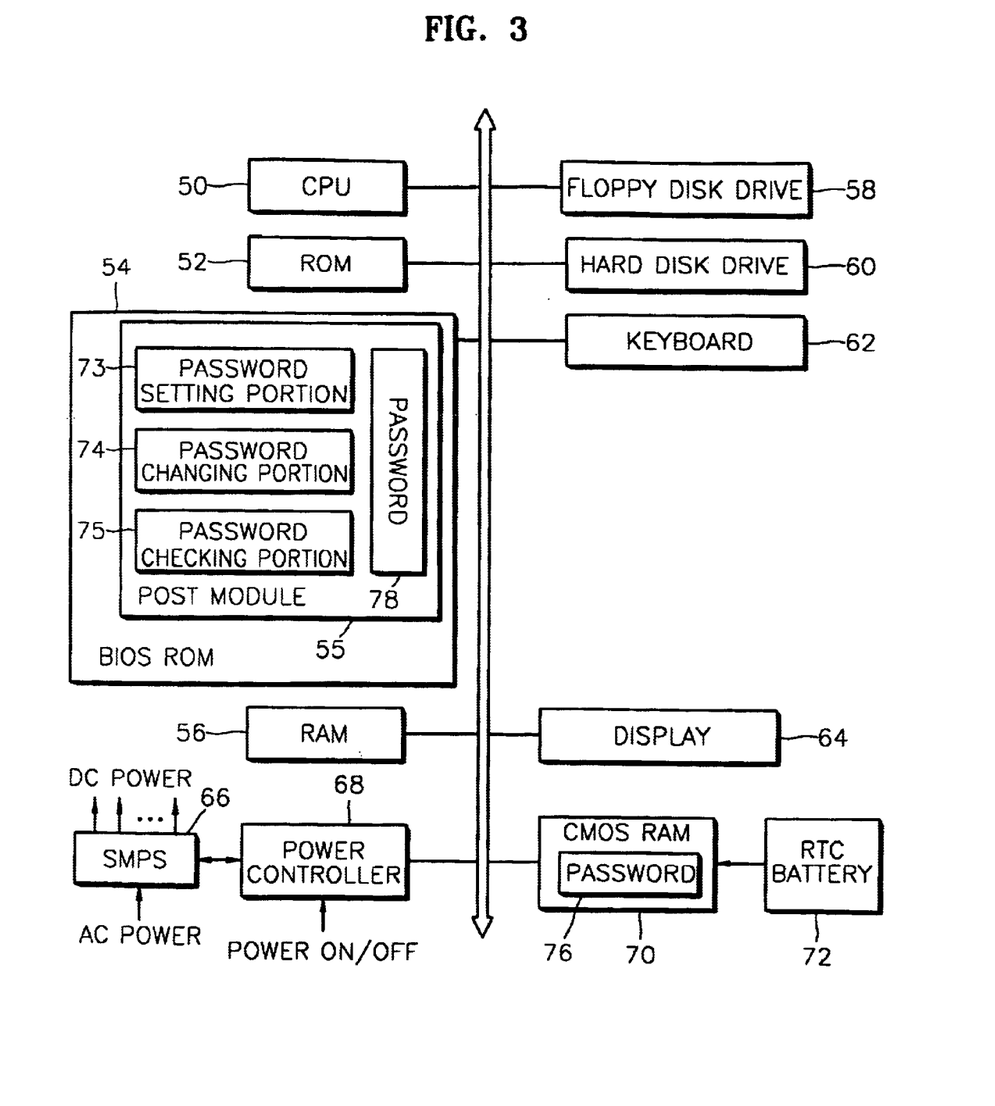
FIG. 3 is a block diagram showing another arrangement of a personal computer according to the present invention.

Referring to FIG. 3, the personal computer according to the present invention includes a central processing unit (CPU) 50, a ROM 52, a BIOS ROM 54 for storing a POST module 55 for checking a state of a computer when power is applied to a computer and an interrupt processing module for managing peripheral equipments, a RAM 56 for storing data, an operating system, and a plurality of application programs, a floppy disk drive 58, a hard disk drive 60, a keyboard 62 as an input apparatus, a display 64 as an output display apparatus, a SMPS 66 for receiving an alternating current power source and supplying direct current power sources to the respective apparatuses, a power controller 68 for receiving on/off command signals from a power switch and controlling the SMPS 66, and a CMOS RAM 70 for receiving power supplied from an RTC battery 72 and storing a system information which must be maintained while the alternating current power source supplied from the outside is intercepted.

In the personal computer according to the present invention, the BIOS ROM 54 including a flash memory is realized as a flash ROM having functions for reading and writing. While CMOS RAM 70 stores a first password 76, the BIOS ROM stores a second password 78. A password setting portion 73, a password changing portion 74, and a password checking portion 75 are further installed in the POST module 55 of the BIOS ROM 54. The password checking portion 75 receives a password input from a user through the keyboard 62 and determines whether the input password is identical to the first password stored in the CMOS RAM 70. When the first password is not set in the CMOS RAM 70, the password checking portion 75 determines whether the input password is identical to the second password stored in the BIOS ROM 54 and proceeds booting the computer only when the first password 72 stored in the CMOS RAM 70 or the second password in the BIOS ROM 54 is identical to the input password input by a user.

The password 78 can be stored in the BIOS ROM 54 by using a method according to the present invention. Also, the password 78 can be stored in a memory ,such a flash memory included in the BIOS ROM 54, having reading and writing functions and not deleted when the power is turned off. The password 78 can be input and stored in the memory of the BIOS ROM 54 when the user inputs a password 76 into the CMOS RAM. The first password 72 input by the user and stored in CMOS RAM 70 is copied and stored into the BIOS ROM 54 as the second password, automatically or manually. In this case the first password is identical to the second password. Otherwise, the user inputs the second password 78 into the BIOS ROM 54 after the user inputs the first password 76 through password windows on a screen of the monitor. The second password 78 may not be identical to the first password or may be identical to the first password.

Figure 4A:
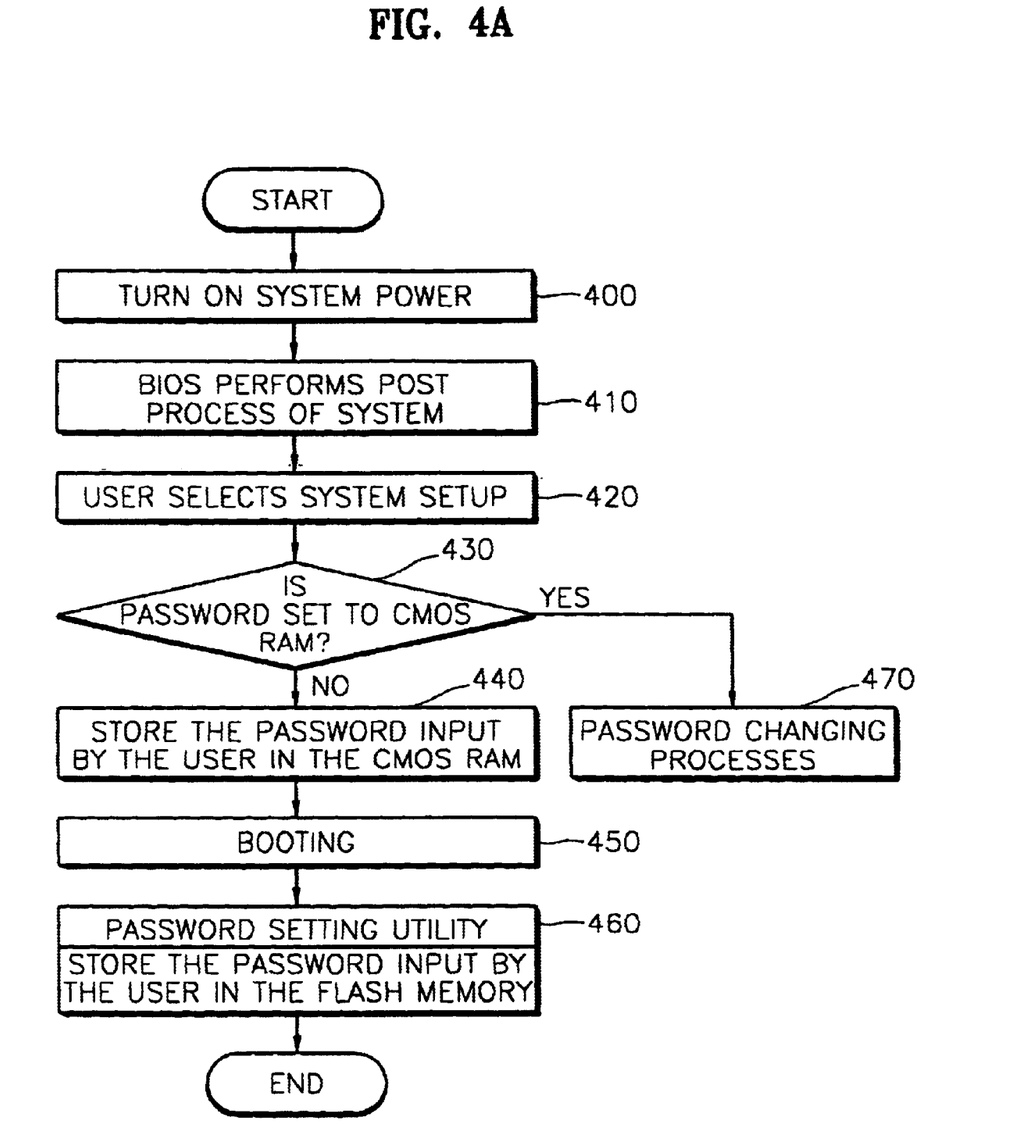
FIGS. 4A–4C are flowcharts showing processes of setting the password of the computer according to the present invention.
Figure 4B:
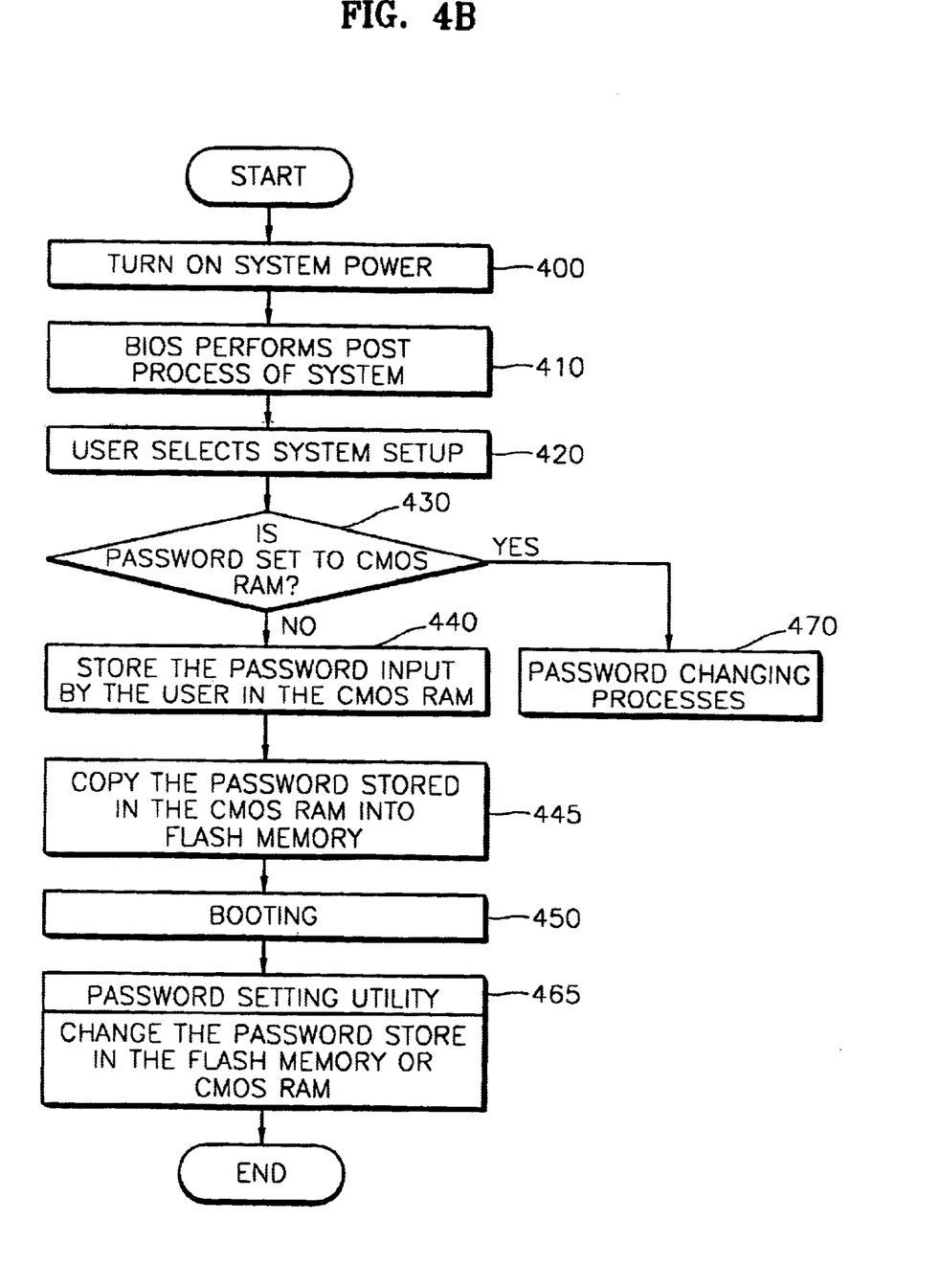
Figure 4C:
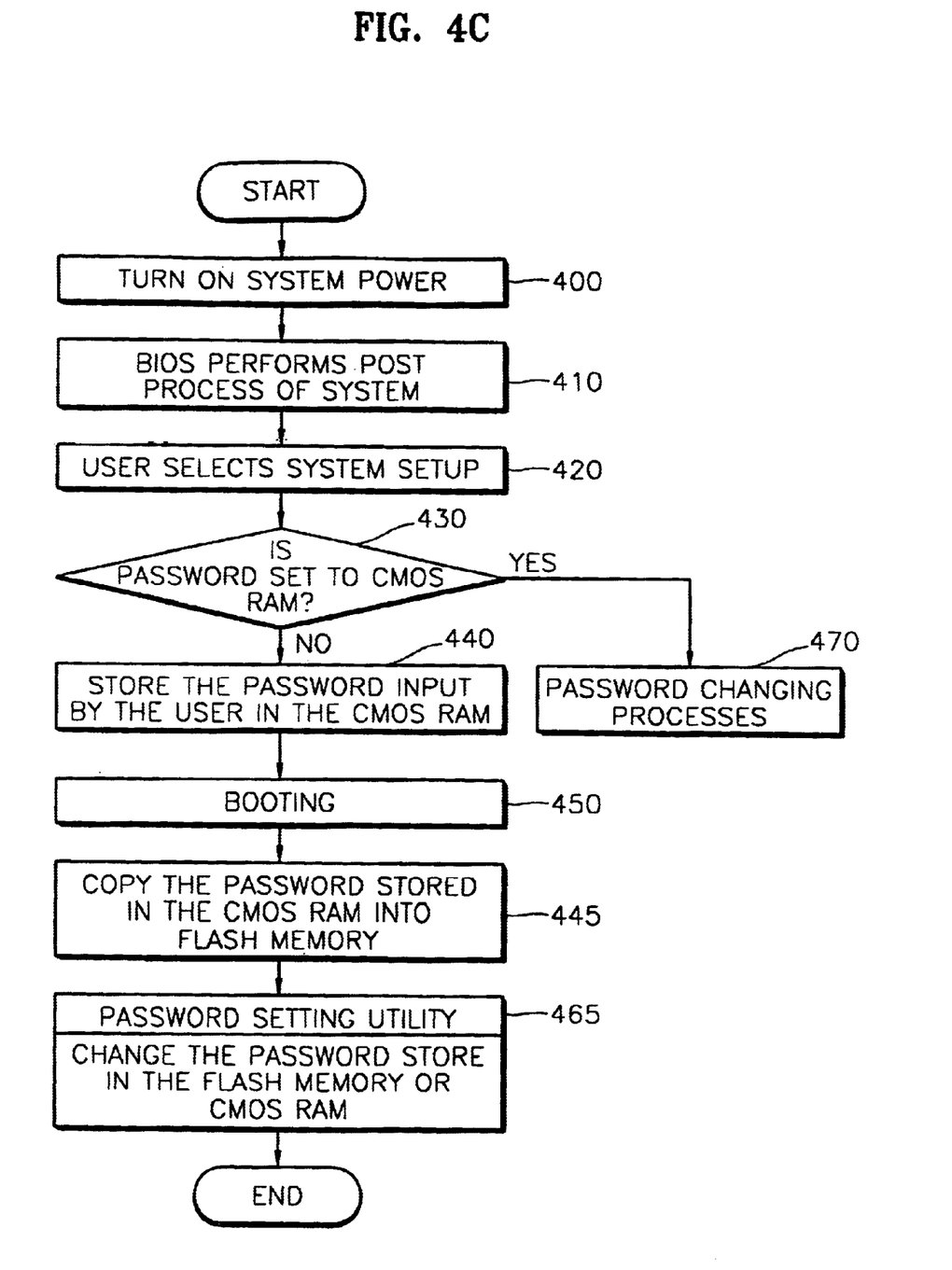

Referring to FIGS. 4A–4C, processes for initially setting a password to a computer are as follows. When the user turns on a power switch connected to the power controller 68 of the computer, the power controller 68 controls the SMPS 66 so as to supply the direct current power suitable for the respective apparatuses of the computer in step 400. The POST module 55 of the BIOS stored in the BIOS ROM 54 performs the POST process under the control of the CPU 50 in step 410. When the user selects a system setup screen provided by the BIOS, the password setting portion 73 included in the POST module 55 confirms whether a password is set to the CMOS RAM 70 in step 430. For this, in a first embodiment of the present invention, a first password setting flag is set and managed.

It is assumed that the password is not set in the CMOS RAM 70 and the value the first password setting flag is OFF in the process of setting the password. Then, the password setting portion 73 displays a message for a user to input a password. When the user inputs the password, the password setting portion 73 stores the input password in the CMOS RAM 70 and changes the value of the first password setting flag into ON in step 440. Accordingly, the initial process of setting the password into the CMOS RAM 70 is completed. When the initial setting of the password is normally performed, the user can instruct to continue booting the computer on the system setup screen in step 450.

The processes of setting the password to the BIOS ROM 54 realized by the flash memory are performed by a separate password setting utility after booting the computer. When the user operate the password setting utility, the password setting utility receives a password to be newly set from the user like in the step 440 and initially sets the received password to the BIOS ROM 54 in step 460. At this time, a second password setting flag is included in the BIOS ROM 54. When the password is initially set, the value of the second password setting flag is turned ON. When there is an password already set in the CMOS RAM 70, a process of changing the password by a password changing portion 74 included in the POST module 55 in step 470 proceeds.

After the password is input by user and stored in the CMOS RAM 70, the process of setting the password to the BIOS ROM 54 can be performed before booting the computer in step 445. The password stored in CMOS RAM 70 is copied and stored in the BIOS ROM 54 in step 445 described in FIG. 4B. In FIG. 4C; the step 445 for copying the password stored in the CMOS RAM 70 and storing the password into the BIOS ROM 54 is performed after booting computer. The password stored in BIOS ROM 54 or CMOS RAM 70 is changed in step 465 described in FIGS. 4B and 4C.

Figure 5A:
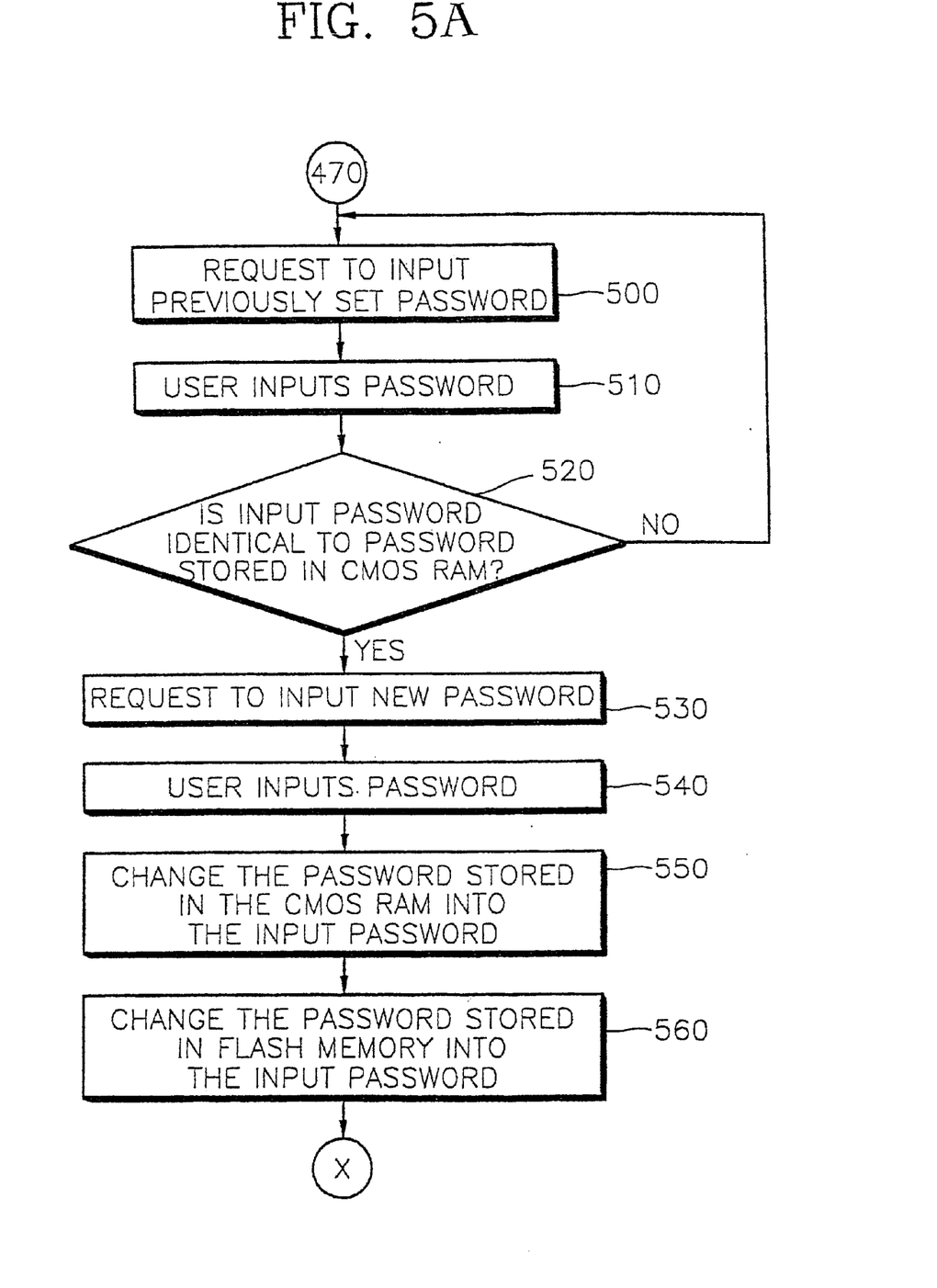
FIGS. 5A–5C are flowcharts showing processes of changing the password of the computer according to the present invention.
Figure 5B:
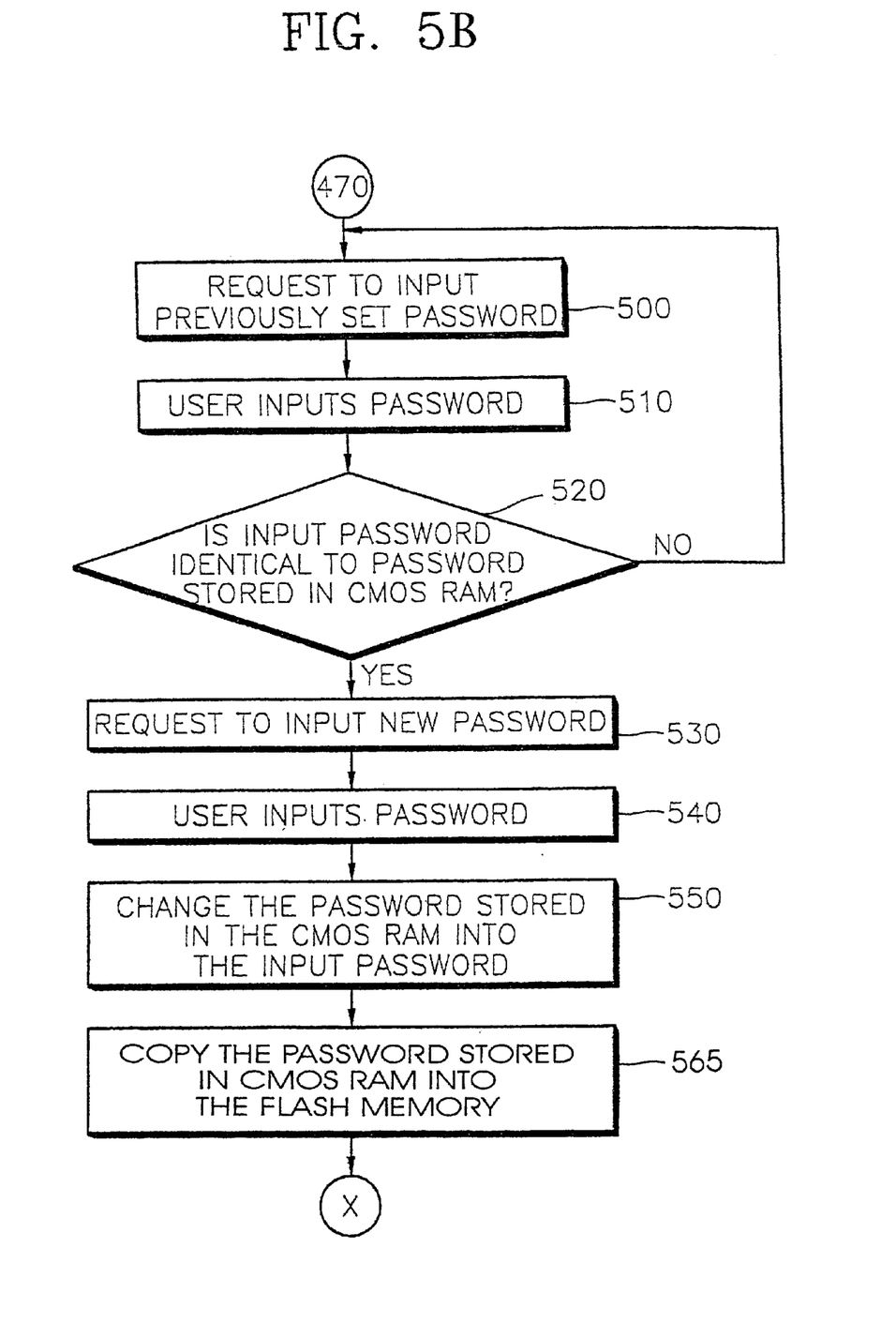
Figure 5C:
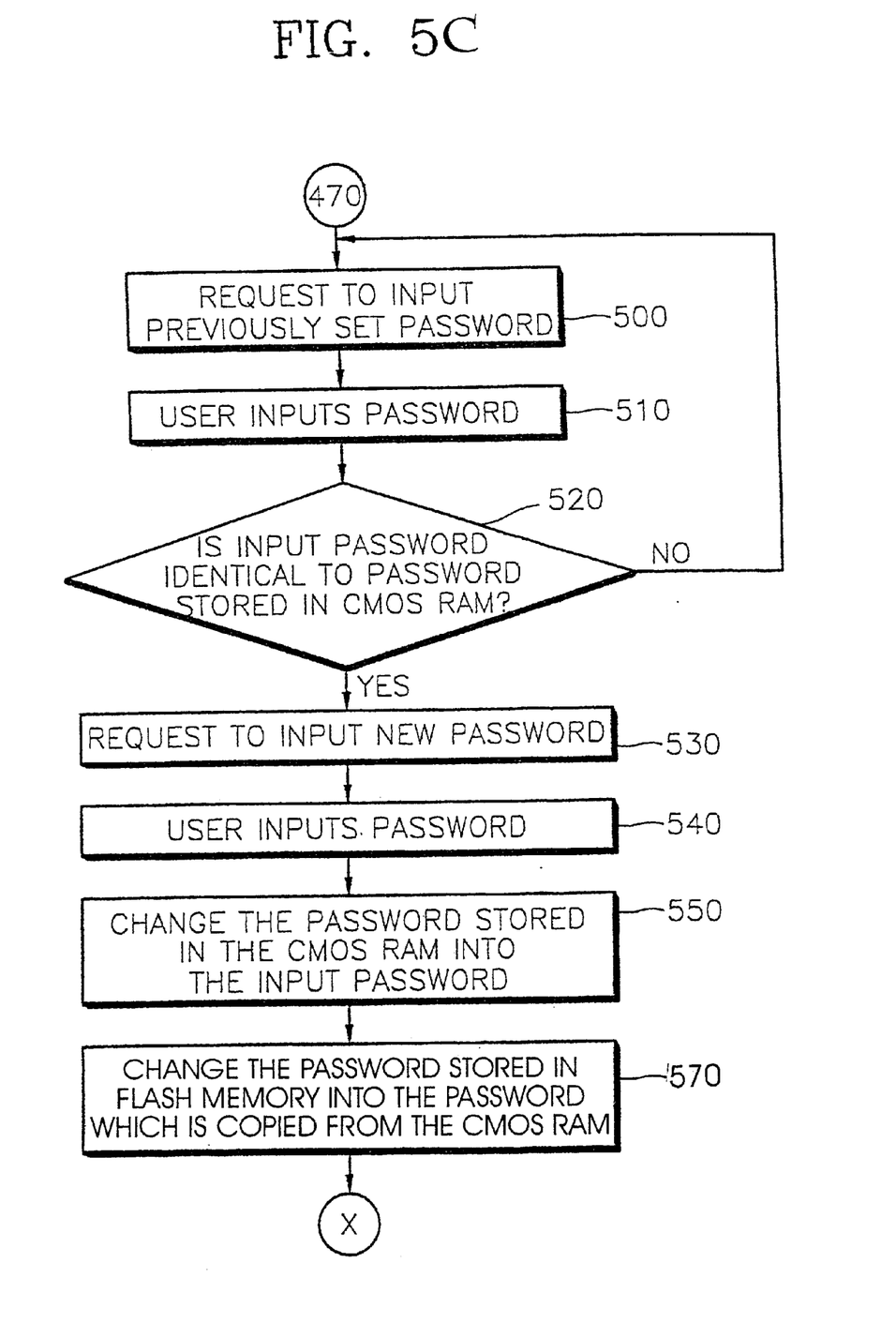

The password changing step in the step 470 will be described in detail in FIGS. 5A–5C. The password changing portion 74 displays a message for a user to input a previously set password. When the user inputs a password, the password changing portion 74 determines whether the input password is identical to the password stored in the CMOS RAM 70 in steps 500 through 520. When the two passwords do not coincide, the password changing portion 74 repeatedly displays a message requesting to input the previously set password in the step 500. At this time, in a preferred embodiment according to the present invention, when the user does not correctly input the password at least three times, the password changing process is terminated. When the two passwords coincide in the step 520, the password changing portion 74 displays a message requesting a user to input a new password in step 530. When the user inputs a new password, the password changing portion 74 changes the password stored in the BIOS ROM 54 as well as the password stored in the CMOS RAM 70 into the new password in steps 540 through 560. When the second password is not stored in BIOS ROM 54, the first password input by user and stored in CMOS RAM 70 is copied and stored into the BIOS ROM 54 as the second password in step 565 described in FIG. 5B. If the second password is stored in BIOS ROM 54, the second password stored in BIOS ROM 54 is changed into the first password, as a new second password, which is copied from the CMOS RAM 70 in step 570 described in FIG. 5C. The first password is copied and stored in BIOS ROM 54 depending on the selection of automatic copying process and manual copying process selected by the user if the user wants to store same password in both CMOS RAM 70 and BIOS ROM 54. Otherwise, the user changes the password stored in BIOS ROM 54 into the input password newly input by the user in step 560 in FIG. 5A. Thus, a first password is stored in the CMOS RAM 70 while a second password is stored in the BIOS ROM54.

Figure 6:
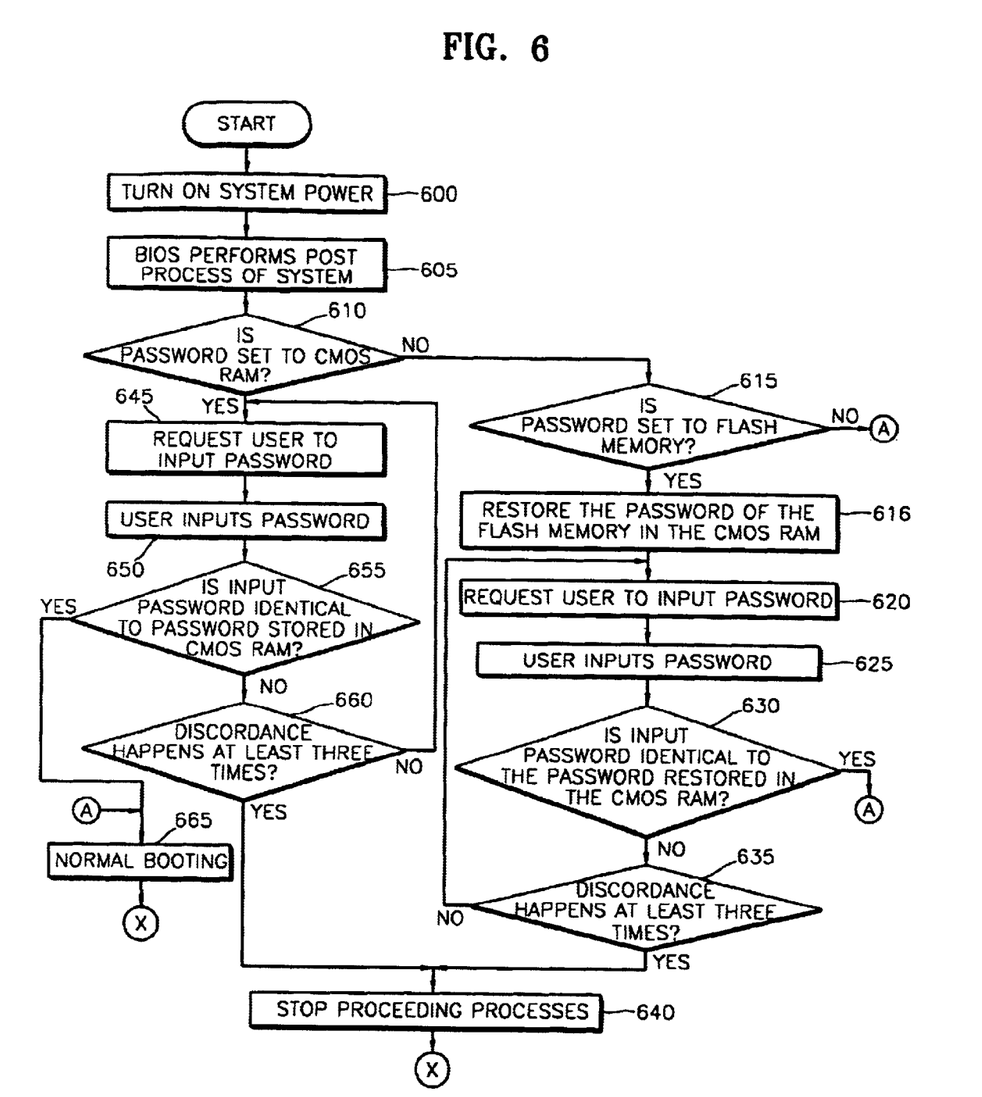
FIG. 6 is a flowchart showing processes of searching the password of the computer according to the present invention.

Referring to FIG. 6, the password checking process of the computer according to the present invention is as follows. When a user turns on the power switch connected to the power controller 68 of the computer, the power controller 68 controls the SMPS 66 to supply the direct current power suitable for the respective apparatuses of the computer in step 600. The POST module 55 stored in the BIOS ROM 54 performs the POST process under the control of the CPU 50 instep 605. During the POST process, a password checking portion 75 included in the POST module 55 determined whether a password is set in the CMOS RAM 70 in step 610. It can be known by checking the value of the first password setting flag set to the CMOS RAM 70.

When the value of the first password setting flag is ON, the password checking portion 75 displays a message requesting a user to input a password. When the user inputs the password, the password checking portion 75 confirms whether the input password is identical to the first password stored in the CMOS RAM 70 in steps 645 through 655. When the two passwords do not coincide, the password checking portion 75 repeatedly displays a message requesting to input the previously set password in the step 645. At this time, in the preferred embodiment of the present invention, when the user does not correctly input the first password at least three times, further processes stop. When the two passwords coincide, a normal booting process proceeds in step 665.

When the value of the first password setting flag is OFF, the password checking portion 75 determines whether the second password is set to the BIOS ROM 54 in step 615. It can be known by checking the value of the second password setting flag set to the BIOS ROM 54. When the value of the second password setting flag is OFF, the password checking portion 75 considers that a user does not install the second password and continues to normally boot the computer in step 665. When the value of the second password setting flag is ON, it can be considered that the user set the second password and that there is something wrong with the password set in the CMOS RAM 70 such as interception between the CMOS RAM 70 and the RTC battery 72.

In this case, the password checking portion 75 displays a messages requesting a user to input a password. When the user inputs the password, the password checking portion 75 determines whether the input password is identical to the second password stored in the BIOS ROM 54 in steps 620 through 630. When the two passwords do not coincide, the password checking portion 75 repeatedly displays a message requesting to input the password in the step 620. At this time, in the preferred embodiment of the present invention, when the user does not correctly input the password at least three times, further processes stop in consideration considering that an illegal user tries to boot the computer in step 640. When the two passwords coincide, normal booting processes continue in step 665.

An embodiment of the password setting portion 73, the password changing portion 74, and the password checking portion 75 of the personal computer according to the present invention can be respectively made programs which can be installed in the computer system and can be implemented in a general digital computer system by operating the program stored in a medium in the computer. The medium includes a magnetic storing medium such as a ROM, a floppy disk, and a hard disk, an optical reading medium such as a CD-ROM and a DVD, and a carrier wave such as a transfer through an Internet.

The medium contains a password setting coder, a password checking coder, and a password changing coder. If the medium is one of a ROM, a floppy disk, a hard disk, and an optical reading medium such as a CD-ROM disk or a DVD disk, the coders stored in the medium are installed in the computer by inserting the medium into a drive for a ROM, a floppy disk, a hard disk, or an optical reading medium. If the medium continuing the coders is a carrier, the coders are installed in the computer by receiving the carrier transferred through an internet. The password setting coder changes a first password setting program stored in the computer for storing a first password in a first memory into a second password setting program for storing said first password in said first memory and a second password in a second memory. The password checking coder changes the first password checking program for checking said first password stored in said first memory into a second password checking program for checking said first password stored in said first memory and said second password stored in said second memory. After password changing coder changes a first password changing program for changing said first password stored in said first memory to a new first password into a second password changing program for changing the first password into a new first password into a new first password in the first memory and the second password into a new second password in the second memory. The second password setting program, the second password checking program, and the second password changing program are installed in a BIOS ROM. After installation of the second password program, the second password checking program, and second password changing program, processes of FIGS. 4A–4C, 5A–5C and 6 can operate in the computer. The recording medium realizes a coders for a user to set a password to the CMOS RAM included in the computer when the computer performs the POST process for storing the password in a flash memory included in the computer after booting the computer into a program code which can be executed in the computer and stores them.

The recording medium realizes the coder for confirming whether a password is set to the CMOS RAM when the computer performs the POST process, for receiving a password from a user when the first password is set to the CMOS RAM and confirming whether the password is identical to the first password stored in the CMOS RAM, for continuing to boot the computer when the password is identical to the first password stored in the CMOS RAM and stopping booting the computer if not, for confirming whether a second password is set in the flash memory when the first password is not set to the CMOS RAM, for continuing booting the computer when the second password is not set to the flash memory, for receiving a password from a user and confirming whether the second password is identical to the second password stored in the flash memory when the second password is set to the flash memory, and for continuing booting the computer when the password is identical to the second password stored in the flash memory and stopping booting the computer if not into a program code which can be executed in the computer and stores them.

Also, the recording medium realizes the coder for requesting a user to change the password when the computer performs the POST process and a coding means for receiving a new password from a user and changing the CMOS RAM and the password stored in the flash memory by the received new password when the previous password input from the user is identical to the password stored in the CMOS RAM into a program code which can be executed in the computer and stores them. Functional program codes and coding means for realizing the present invention can be easily estimated by programmers skilled in the art.

According to the present invention, it is possible to prevent a person who does not know the password of a user from deleting the password of the user and using the computer when the computer of the user is stolen or lost.

What is claimed is:

1. A method for a computer, comprising the steps of:
   reading an existence of a first password in a first memory;
   reading an existence of a second password in a second memory when said first password does not exist in said first memory; and
   allowing a resume function to operate when said second password does not exist in second memory.

2. The method claim 1, further comprised of the step of reading said first password.

3. The method of claim 1, further comprised of the step of allowing a user to input an input password.

4. The method of claim 3, further comprised of the step of determining whether said input password is identical to said first password when said first password exists in said first memory.

5. The method of claim 4, further comprised of the step of allowing a resume function to operate when said input password is identical to said first password.

6. The method of claim 4, further comprised of the step of ending a booting function when said input password is not identical to said first password.

7. The method of claim 3, further comprised of the step of determining whether said input password is identical to said second password when said first password does not exist in said first memory and when said second password exists in said second memory.

8. The method of claim 7, further comprised of the step of allowing a resume function to operate when said input password is identical to said second password.

9. The method of claim 7, further comprised of the step of ending a booting function when said input password is not identical to said second password.

10. The method of claim 1, further comprised of the step of allowing a user to input said first password into said first memory.

11. The method of claim 10, further comprised of the step of copying said first password stored in said first memory into said second memory as said second password.

12. The method of claim 1, wherein said first memory is a CMOS RAM.

13. The method of claim 1, wherein said second memory is a BIOS ROM.

14. The method of claim 1, further comprised of the step of allowing a user to change a password stored in said first memory to said first password.

15. The method of claim 14, further comprised of the step of copying said first password stored in said first memory into said second memory as said second password.

16. A method for a computer, comprising of the steps of;
    determining a existence of a first password in a first memory; and
    determining whether an input password input by a user is identical to a second password stored in a second memory when said first password does not exist in said first memory; and allowing a resume function to operate in said computer when said second password does not exist in said second memory.

17. The method of claim 16, further comprised of the step of allowing a resume function to operate in said computer when said input password is identical to said second password.

18. The method of claim 16, further comprised of the step of ending a booting function in said computer when said input password is not identical to said second password.

19. An apparatus for a computer, comprising;

a first memory for storing a first password;

a second memory for storing a second password;

a password checking module connected to said first memory and said second memory for reading said second password when said first password does not exist, said password checking module allowing a resume function to operate in said computer when said second password does not exist in said second password memory.

20. The apparatus of claim 19, further comprised of said password checking module for ending a booting function when said second password is not identical to an input password input by a user.

21. The apparatus of claim 19, further comprised of said password checking module for allowing a resume function to operate in said computer when said second password is identical to an input password input by a user.

22. The apparatus of claim 19, further comprised of said password checking module for allowing a resume function to operate in said computer when said second password does not exist in said second memory.

23. The apparatus of claim 19, wherein said first memory is a CMOS RAM.

24. The apparatus of claim 19, wherein said second memory is a BIOS ROM.

25. A medium for a computer, comprising:

a password setting coder stored in said medium and installed in said computer, said password setting coder changing a first password setting program for storing a first password in a first memory into a second password setting program for storing said first password in said first memory and a second password in a second memory; and a password checking coder stored in said medium and installed in said computer, said password checking coder changing a first password checking program for checking said first password stored in said first memory into a second password checking program for checking said first password stored in said first memory and said second password stored in said second memory.

26. The medium of claim 25, further comprised of said password checking coder changing a first password changing program for changing said first password stored in said first memory to a new first password into a second password changing program for changing said first password into a new first password in said first memory and said second password into a new second password in said second memory.

27. The medium of claim 25, further comprised said password setting and checking coders being installed in a BIOS ROM.

28. The medium of claim 25, wherein said medium is any one of a ROM, a floppy disk, a hard disk, an optical reading medium, and a carrier transferred through an Internet.

* * * * *